United States Patent [19]
Youngblood

[11] Patent Number: 5,343,396
[45] Date of Patent: Aug. 30, 1994

[54] SENSOR MALFUNCTION DETECTION

[76] Inventor: Richard J. Youngblood, 242 Easthill Dr., Battle Creek, Mich. 49017

[21] Appl. No.: 875,995

[22] Filed: Apr. 29, 1992

[51] Int. Cl.⁵ .................. G01M 19/00; G06F 15/20; B60T 17/22
[52] U.S. Cl. .................. 364/426.01; 364/426.02; 364/424.03; 303/92
[58] Field of Search .................. 364/426.01, 426.02, 364/551.01, 431.07; 303/100, 103, 105, 110, 92; 371/67.1

[56]  References Cited
U.S. PATENT DOCUMENTS

| | | | |
|---|---|---|---|
| 4,530,059 | 6/1985 | Brearley et al. | 364/426 |
| 4,700,304 | 10/1987 | Byrne et al. | 364/426 |
| 4,824,183 | 4/1989 | Uchida et al. | 303/92 |
| 4,928,242 | 5/1990 | Suzuki | 364/424.03 |
| 5,072,393 | 12/1991 | Mori et al. | 364/426.02 |
| 5,095,269 | 3/1992 | McNinch, Jr. | 324/166 |
| 5,105,359 | 4/1992 | Okubo | 364/426.02 |
| 5,124,921 | 6/1992 | Jonner et al. | 364/426.01 |
| 5,130,933 | 7/1992 | Kitano | 364/487 |
| 5,132,907 | 7/1992 | Ishikawa | 364/426.02 |
| 5,138,566 | 8/1992 | Yoshino | 364/426.02 |

FOREIGN PATENT DOCUMENTS

| | | |
|---|---|---|
| 2546481 | 4/1977 | Fed. Rep. of Germany . |
| 2547869 | 4/1977 | Fed. Rep. of Germany . |
| 2942442 | 5/1981 | Fed. Rep. of Germany . |
| 3903069 | 8/1989 | Fed. Rep. of Germany . |
| 3903071 | 8/1989 | Fed. Rep. of Germany . |
| 2099610 | 3/1972 | France . |

Primary Examiner—Thomas G. Black
Assistant Examiner—Tan Q. Nguyen

[57]  ABSTRACT

A method for checking and controlling the quality of output signals from wheel speed sensors installed on wheels of vehicles equipped with an automatic braking system includes determining from sensed wheel speeds the deceleration of a wheel, timing any period of deceleration the level of which is above a predetermined level, defining any wheel speed sensor associated with a wheel having an indicated deceleration above the predetermined level for a time exceeding a predetermined period as being malfunctioning, excluding the output signals from the malfunctioning wheel speed sensor, and replacing the excluded output signals with output signals from a wheel speed sensor installed on an alternate wheel.

9 Claims, 4 Drawing Sheets

WHEEL SPEED SENSOR OUTPUT SIGNALS

1

SENSOR MALFUNCTION DETECTION

TECHNICAL FIELD

This invention relates to a method for checking the output signal quality of wheel speed sensors on an automatic-braking-system-equipped vehicle to detect a malfunctioning sensor.

BACKGROUND ART

Methods for ensuring the output signal quality of vehicle wheel speed sensors have been known for some time. These methods, however, have been limited to checking the electrical continuity of sensors while the wheels are not in motion and to checking for the presence of some electrical output from sensors while the wheels are in motion.

While each of these methods or combinations of both function with a certain degree of efficiency, they do not disclose the advantages of the improved sensor signal quality control method of the present invention as is hereinafter more fully described.

DISCLOSURE OF THE INVENTION

An object of the present invention is to provide an improved method for checking and controlling the signal quality of individual vehicle wheel speed sensors.

An advantage of the present invention is that vehicle wheel speed sensors are not only checked for the presence of electrical output signals but that each output is checked to ensure that it conforms to certain minimum requirements.

A feature of the present invention is that, when a malfunctioning vehicle wheel speed sensor is identified, it is electrically isolated from any associated wheel speed sensor system being used so that the latter can continue to operate.

In realizing the aforementioned and other objects, advantages and features, the method of the present invention for checking and controlling the quality of output signals from wheel speed sensors installed on wheels of vehicles equipped with automatic braking systems initially includes defining a braking condition and a period. A condition during which wheel deceleration exceeds a specific level is defined as being an automatic braking system condition. A period beyond which a continuous condition of automatic braking system resulting from deceleration sensed by a wheel speed sensor is defined as indicating a malfunction of that wheel speed sensor.

The speed of each of a plurality of vehicle wheels is sensed at predetermined intervals, and the deceleration of each wheel is calculated from any difference in sensed wheel speed. The calculated level of deceleration of each wheel is compared with the level defining an automatic braking system condition. Any period during which the calculated level of deceleration of a wheel exceeds the level defining an automatic braking system condition is timed and compared with the period defining a wheel speed sensor malfunction. If the period during which the calculated level of deceleration of a wheel exceeds the level defining an automatic braking system condition exceeds the period defining a wheel speed sensor malfunction, the output signals from the malfunctioning wheel speed sensor is excluded and are replaced with output signals from a wheel speed sensor installed on an alternate wheel.

The objects, advantages and features of the method of the present invention are readily apparent from the following detailed description of the best mode for carrying out the invention when taken in connection with accompanying drawing.

BRIEF DESCRIPTION OF THE DRAWING

A more complete appreciation of the invention and many of the attendant advantages thereof may be readily obtained by reference to the following detailed description when considered with the accompanying drawing, wherein.

BEST MODE FOR CARRYING OUT THE INVENTION

Figure 1:
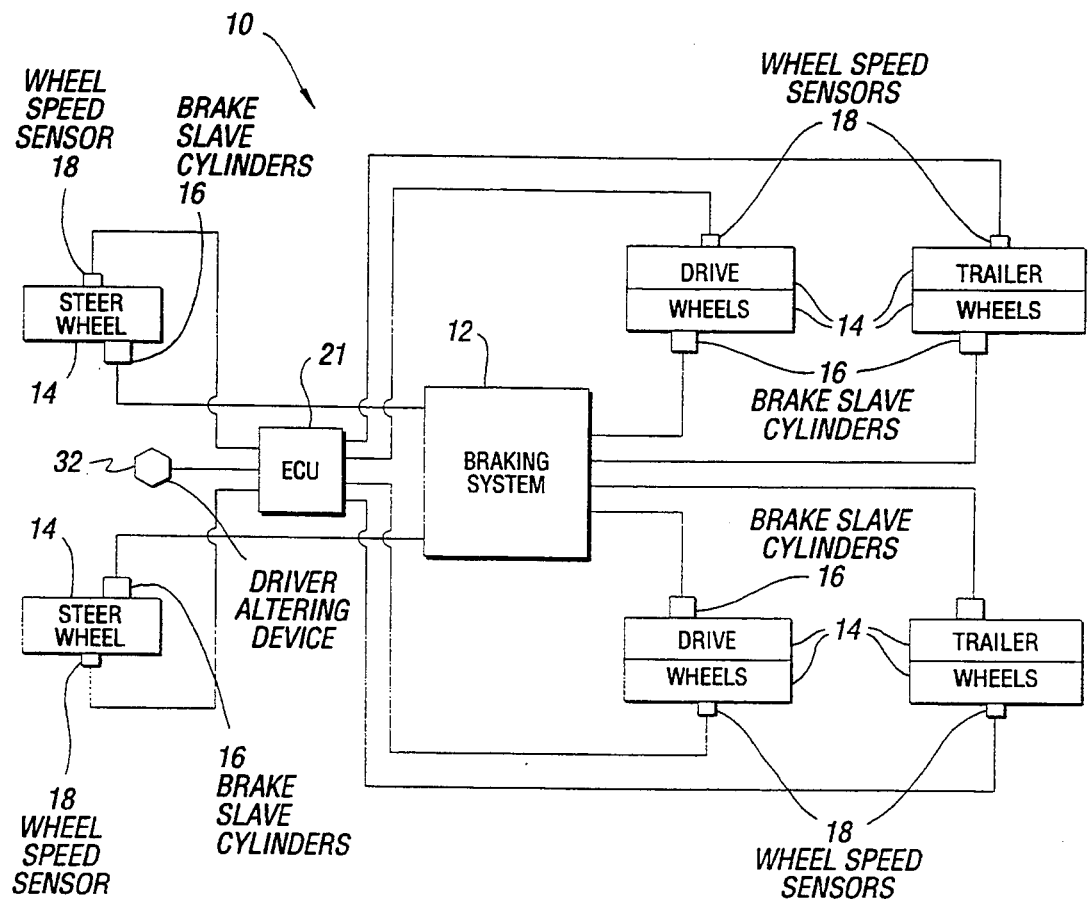
FIG. 1 is a diagrammatical representation of a vehicle having an automatic braking system and means for ensuring the output signal quality of vehicle wheel speed sensors.

As shown in FIG. 1 of the drawings, many vehicles, generally indicated by reference numeral 10, are being equipped with automatic braking systems 12 (ABS). A primary function of such a system is to prevent braking wheels 14 from locking, which reduces braking efficiency. On a moving vehicle 10, wheel lock is usually preceded by a rapidly decelerating wheel 14. During normal operation, wheel deceleration levels are below 0.3 g, and automatic braking system intervention is not required. During quick stops, however, where attending rapid deceleration can lead to wheel lock, automatic braking system intervention is desirable. An automatic braking system 12 reduces brake pressure to a brake slave cylinder 16 mounted on each wheel 14 or set thereof if the level of deceleration of a wheel 14 is above a predetermined threshold and conversely increases brake pressure if the level of acceleration or speed of the wheel 14 is above a predetermined threshold.

Figure 2:
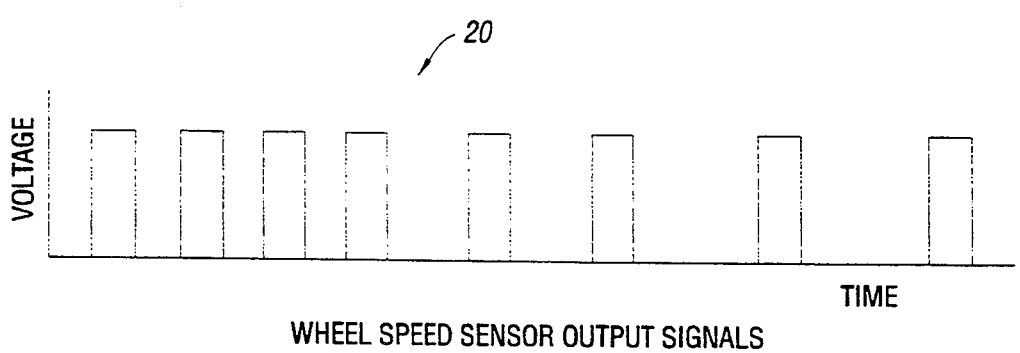
FIG. 2 is a graphic representation of a typical wheel speed sensor output signal.

In the preferred embodiment of the present invention, a wheel speed sensor 18 is mounted on each of as many wheels 14 as desired; and a sensor output signal, which is representative of wheel speed and an example of which is generally indicated by reference numeral 20 of FIG. 2 of the drawings, from each sensor 18 (FIG. 1) is monitored individually by an electronic control unit (ECU) 21. Based on the sensor output signal 20 of its associated wheel speed sensor 18, the speed of each wheel 14 is calculated periodically, typically between every 5 and 15 milliseconds and preferably every 10 milliseconds.

Figure 3:
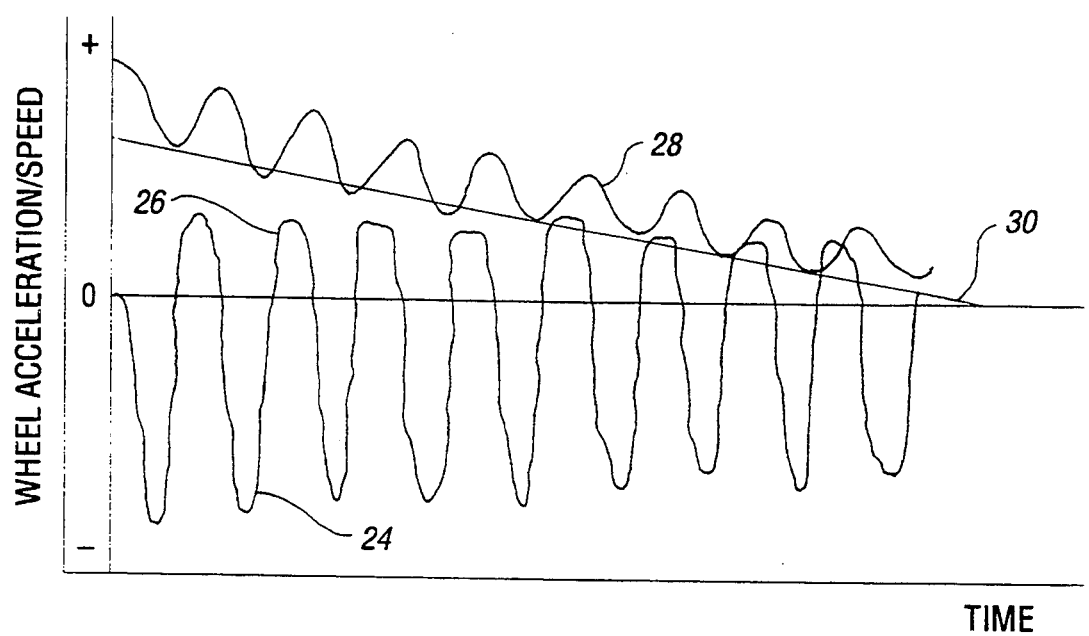
FIG. 3 is a graphic representation illustrating a normal application of an automatic braking system and showing typical alternate wheel decelerations and accelerations and their relationship to true wheel speed.

In FIG. 2, the wheel speed sensor output signal 20 is graphically depicted as a series of pulses. The first four pulses are shown evenly spaced along the time coordinate as an example of a condition that is interpreted as indicating a constant wheel speed. The next pulses occur with less frequency along the time coordinate, and this is interpreted as indicating a decreasing wheel speed. Wheel deceleration is then calculated based on the reduction of wheel speed during a specific period. Above a specific level of deceleration, an automatic braking system condition is defined to exist. An automatic braking system condition signal is generated by the electronic control unit 21, and the automatic braking system 12 is activated. The specific level of deceleration at which it is activated is a function of a number of variables, such as vehicle speed, but a level of 0.6 g is typically within a range within which it is activated. FIG. 3 of the drawings graphically illustrates a normal application of the automatic braking system and shows typical alternate wheel decelerations 24 and accelerations 26 and their relationship to true wheel speed 28. The line 30 represents a predicted reference wheel speed, which is the braking wheel speed at which longitudinal wheel slip has been determined to be minimal and lateral wheel slip acceptable. In practice, the reference wheel speed is maintained between 80 and 85 percent of the nonbraking wheel speed.

Figure 4:
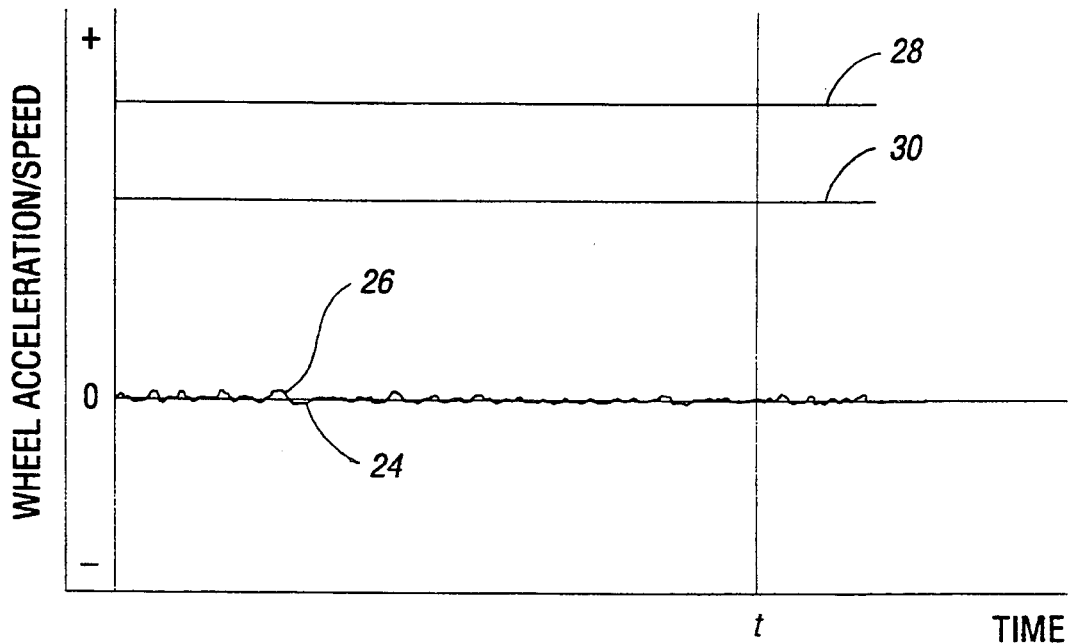
FIG. 4 is a graphic representation illustrating typical alternate wheel decelerations and accelerations and their relationship to a constant true wheel speed associated with a normally functioning wheel speed sensor.

The present invention includes a method for checking wheel speed sensors 18 for spurious output signals. FIG. 4 of the drawings illustrates typical alternate wheel decelerations 24 and accelerations 26 and their relationship to true wheel speed 28 and to the reference wheel speed 30 associated with a normally functioning wheel speed sensor 18 (FIG. 1) on a vehicle 10 operating at a substantially constant speed.

Figure 5:
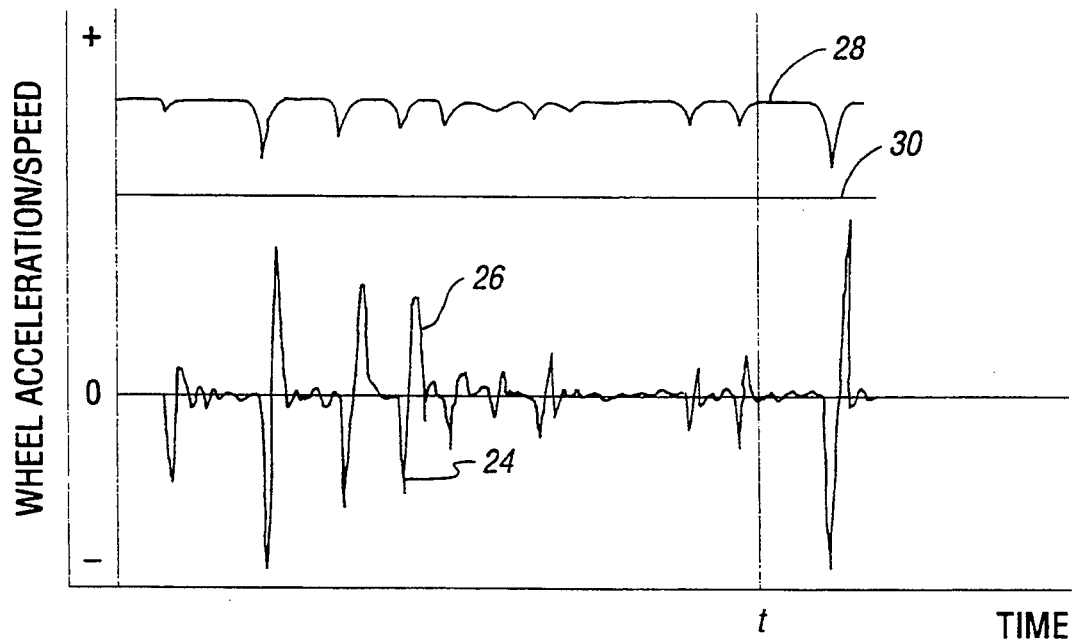
FIG. 5 is a graphic representation illustrating typical alternate wheel decelerations and accelerations and their relationship to a constant true wheel speed associated with a malfunctioning wheel speed sensor.

A spurious output signal from a damaged, out-of-specification or improperly installed wheel speed sensor 18 can be interpreted to erroneously indicate, for example, that a wheel 14 is decelerating in a sinusoidal manner. FIG. 5 of the drawings illustrates possible alternate wheel decelerations 24 and accelerations 26 and their relationship to true wheel speed 28 and to the reference wheel speed 30 associated with a malfunctioning wheel speed sensor 18 (FIG. 1) that is emitting a sensor output signal 20 (FIG. 2) above the threshold of automatic braking system activation. As shown, the condition could persist during normal, steady-state driving, reducing the braking ability of the vehicle.

The present invention not only identifies this condition; it also provides an indication thereof to the driver of the vehicle, electrically isolates the malfunctioning wheel speed sensor, and thereafter uses signals only from alternate, properly functioning wheel speed sensors 18.

Figure 6:
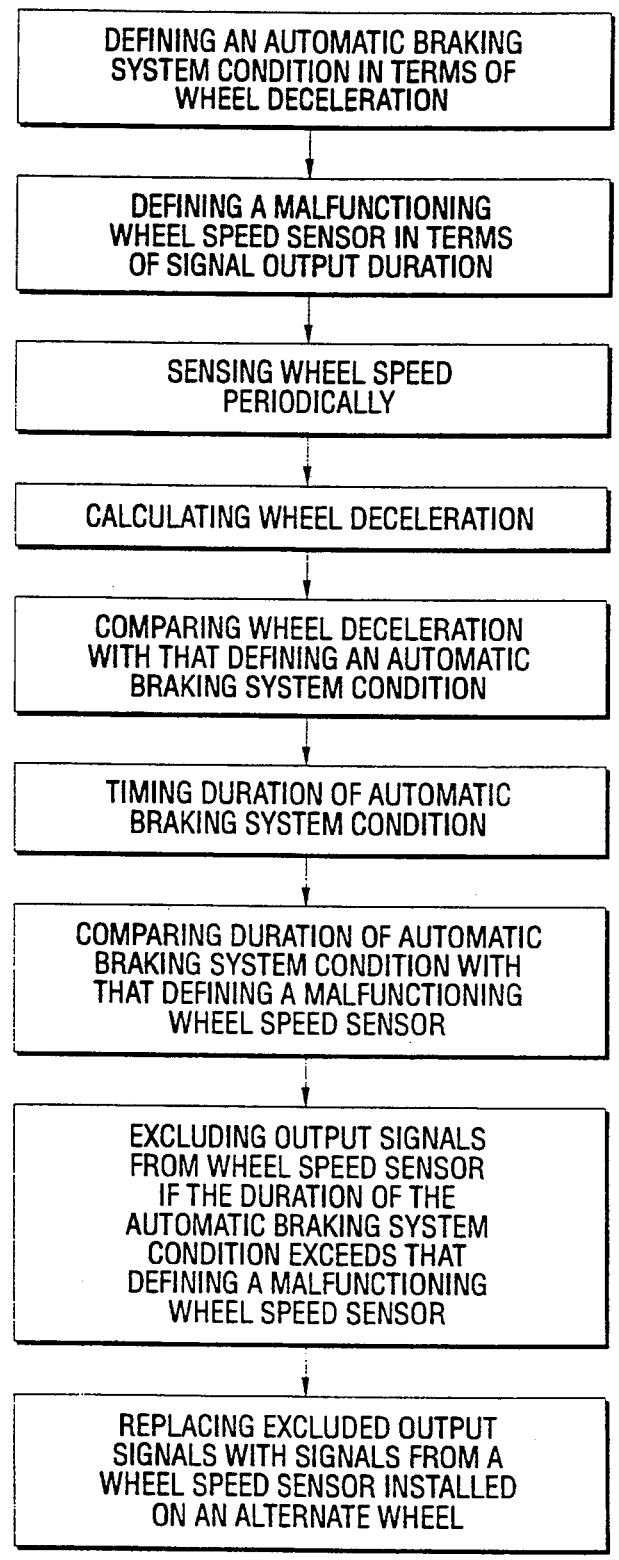
FIG. 6 is a flow diagram illustrating a method of the present invention for checking and controlling the output signal quality of vehicle wheel speed sensors.

With reference to FIG. 6 of the drawings, shown is a flow diagram illustrating a method for checking and controlling the quality of output signals 20 (FIG. 2) from wheel speed sensors 18 (FIG. 1) installed on a vehicle equipped with an automatic braking system 12. As shown, the first step of the method includes defining a braking condition. As previously mentioned, automatic braking system intervention is demanded only when deceleration beyond a certain level is required. Accordingly, the first step defines a condition wherein wheel deceleration exceeds a specific level as being an automatic braking system condition.

Such a condition can realistically exist only for a period of finite duration, however, beyond which the vehicle 10 would be stopped and the wheel 14 no longer decelerating. Consequently, if such a condition is continuously detected for a period of unreasonable duration, an example of which is indicated by time t in FIG. 5, that is interpreted as being an indication of a malfunctioning wheel speed sensor 18. The duration of this period can vary typically between 0.5 and 3 minutes, but the preferred duration is about two minutes. The second step thus includes defining a maximum period during which an automatic braking system condition can exist continuously before it is assumed that a wheel speed sensor 18 is malfunctioning.

Since wheel deceleration is calculated from a change of wheel speed with respect to time, the third step includes sensing the speed of each of a plurality of vehicle wheels at predetermined intervals; and the fourth step includes calculating from any difference in sensed wheel speed over time the level of deceleration of each wheel 14 (FIG. 1). The fifth step includes comparing the calculated level of deceleration of each wheel 18 with the level defining an automatic braking system condition to determine if such a condition exists.

The sixth step includes timing any period during which the calculated level of deceleration of a wheel 14 exceeds the level defining an automatic braking system condition, and the seventh step includes comparing such a period with the period defining a wheel speed sensor malfunction. The eighth step includes excluding the output signal 20 from any wheel speed sensor 18 associated with a wheel 14 the calculated level of deceleration of which exceeds the level defining an automatic braking system condition for a period exceeding that defining a wheel speed sensor malfunction. The ninth step includes replacing the excluded output signal with an output signal from a wheel speed sensor installed on an alternate wheel 14. An additional step includes activating a driver alerting device 32 (FIG. 1) such as a light.

While the best mode for carrying out the invention has been described in detail, those familiar with the art to which this invention relates will recognize various alternative designs and embodiments for practicing the invention as defined by the following claims.

What is claimed is:

1. A method for checking and controlling the quality of sensor output signals generated by wheel speed sensors of vehicles equipped with an automatic braking system, the method comprising the steps of:

(a) defining wheel deceleration above a specific level as being an automatic braking system condition;

(b) defining a maximum period after which a continuously received sensor output signal from a wheel speed sensor indicating that the automatic braking system condition exists is defined as indicating that the wheel speed sensor is malfunctioning;

(c) sensing the speed of each of a plurality of vehicle wheels at predetermined and periodic intervals and generating a sensor output signal representative thereof;

(d) calculating from successive sensor output signals the level of any deceleration of each wheel;

(e) comparing the calculated level of deceleration of each wheel with the level defining the automatic braking system condition and generating an automatic braking system condition signal if such a condition exists;

(f) timing any period during which the automatic braking system condition signal is being generated;

(g) comparing the period during which the automatic braking system condition signal is being generated with the period defining a wheel speed sensor malfunction and generating a sensor malfunction signal if the former period exceeds the latter period;

(h) excluding the sensor output signal from any wheel speed sensor responsible for the generation of the sensor malfunction signal; and (i) replacing the excluded sensor output signal with an output signal from a wheel speed sensor associated with an alternate wheel.

2. The method as defined by claim 1, further comprising an additional step (j), the step including activating a driver alerting device.

3. The method as defined by claim 2, wherein the length of the maximum period of step (b) ranges between 0.5 and 3 minutes.

4. The method as defined by claim 3, wherein the length of the predetermined and periodic intervals of step (c) ranges between 5 to 15 milliseconds.

5. A system for checking and controlling the quality of sensor output signals generated by wheel speed sensors of vehicles equipped with an automatic braking system, the system comprising:

means for defining wheel deceleration above a specific level as being an automatic braking system condition;

means for defining a maximum period after which a continuously received sensor output signal from a wheel speed sensor indicating that the automatic braking system condition exists is defined as indicating that the wheel speed sensor is malfunctioning;

means for sensing the speed of each of a plurality of vehicle wheels at predetermined and periodic intervals and generating a sensor output signal representative thereof;

means for calculating from successive sensor output signals the level of any deceleration of each wheel;

means for comparing the calculated level of deceleration of each wheel with the level defining the automatic braking system condition and generating an automatic braking system condition signal if such a condition exists;

means for timing any period during which the automatic braking system condition signal is being generated;

means for comparing the period during which the automatic braking system condition signal is being generated with the period defining a wheel speed sensor malfunction and generating a sensor malfunction signal if the former period exceeds the latter period;

means for excluding the sensor output signal from any wheel speed sensor responsible for the generation of the sensor malfunction signal; and means for replacing the excluded sensor output signal with an output signal from a wheel speed sensor associated with an alternate wheel.

6. The system as defined by claim 5, further comprising:

a driver altering device; and means for activating the driver warning device when the sensor output signal from any wheel speed sensor responsible for the generation of the sensor malfunction signal has been excluded.

7. The system as defined by claim 6, wherein the driver alerting device is an illuminated display.

8. The system as defined by claim 7, wherein the length of the maximum period after which a continuously received sensor output signal from a wheel speed sensor indicating that an automatic braking system condition exists is defined as indicating that a wheel speed sensor is malfunctioning ranges between 0.5 and 3 minutes.

9. The system defined by claim 8, wherein the length of the predetermined and periodic intervals at which the speed of each of a plurality of vehicle wheels is sensed ranges between 5 to 15 milliseconds.

* * * * *

UNITED STATES PATENT AND TRADEMARK OFFICE
CERTIFICATE OF CORRECTION

PATENT NO. : 5,343,396
DATED : August 30, 1994
INVENTOR(S) : RICHARD J. YOUNGBLOOD It is certified that error appears in the above-indentified patent and that said Letters Patent is hereby corrected as shown below:

On the title page, item [73] should read as follows:
"[73]  Assignee:  Eaton Corporation, Cleveland, Ohio."

"Attorney, Agent, or Firm - Brooks & Kushman P.C."

Signed and Sealed this

Eleventh Day of April, 1995

*Attest:*

BRUCE LEHMAN

*Attesting Officer*  *Commissioner of Patents and Trademarks*